(12) United States Patent
Abdo et al.

(10) Patent No.: US 12,539,000 B2
(45) Date of Patent: Feb. 3, 2026

(54) ERGONOMIC WHISK FOR FOOD PROCESSING

(71) Applicant: SOCIETE DES PRODUITS NESTLE S.A., Vevey (CH)

(72) Inventors: Samer Abdo, Lonay (CH); Da Mi Byun, Lausanne (CH); Sylvain DeCastel, Remaufens (CH); Bertrand Guyon, Saint Point Lac (FR); Johan Nieuwendijk, Vienna (AT); Mohamed Raad, Lausanne (CH); Martino Ruggiero, Lonay (CH); Laurent Seydoux, Gillarens (CH); Wolfgang Tuider, Oberwart (AT)

(73) Assignee: Societe des Produits Nestle S.A., Vevey (CH)

( * ) Notice: Subject to any disclaimer, the term of this patent is extended or adjusted under 35 U.S.C. 154(b) by 1899 days.

(21) Appl. No.: 16/461,890

(22) PCT Filed: Dec. 11, 2017

(86) PCT No.: PCT/EP2017/082208
§ 371 (c)(1),
(2) Date: May 17, 2019

(87) PCT Pub. No.: WO2018/108804
PCT Pub. Date: Jun. 21, 2018

(65) Prior Publication Data
US 2019/0274482 A1    Sep. 12, 2019

(30) Foreign Application Priority Data
Dec. 13, 2016 (EP) ...................................... 16203727

(51) Int. Cl.
*A47J 43/07* (2006.01)
*A47J 43/046* (2006.01)

(52) U.S. Cl.
CPC ....... *A47J 43/0722* (2013.01); *A47J 43/0465* (2013.01)

(58) Field of Classification Search
CPC .... A47J 43/0465; A47J 43/085; A47J 27/004; A47J 27/08; A47J 27/14; A47J 43/04;
(Continued)

(56) References Cited

U.S. PATENT DOCUMENTS

| 5,645,346 A | 7/1997 | Thuna |
| 6,254,019 B1 | 7/2001 | Galbreath |

(Continued)

FOREIGN PATENT DOCUMENTS

| CN | 103006100 A | | 4/2013 |
| CN | 103099542 A | * | 5/2013 |

(Continued)

*Primary Examiner* — Vy T Nguyen
(74) *Attorney, Agent, or Firm* — K&L Gates LLP

(57) ABSTRACT

A machine (1) for stirring a liquid food substance has: a container (10) delimiting a cavity (11) with a bottom (12) and a peripheral wall (13) for containing said liquid food substance to be stirred, the cavity (11) extending generally along a generally upright central container axis (14) and having a mouth (15) for removing from the container (10) said liquid food substance upon stirring; and an impeller (20) comprising an impelling member (21) which is configured to be rotated in the cavity (11) against said liquid food substance about an impeller axis (22) that is generally identical or generally parallel to the container axis (14). The impelling member (21) is configured to be spaced above the cavity's bottom (12) by: a maximum stirring distance (H) when the impelling member (21) is rotated at at a maximum stirring speed about the impeller axis (22); and a resting distance (h), smaller than the maximum stirring distance (H), when the impelling member (21) stands still.

16 Claims, 2 Drawing Sheets

(58) Field of Classification Search
CPC .... A47J 43/044; A47J 43/046; A47J 43/0705;
A47J 43/0711; A47J 43/082; A47J 44/02;
B01F 33/453; B01F 2101/14; B01F
23/232; B01F 25/3121; B01F 27/50;
B01F 27/707; B01F 33/05; B01F 33/053;
B01F 33/45; B01F 33/452; B01F
33/4535; B01F 35/4112; A23G 9/045;
A23G 9/12; A23G 9/224
USPC .............................. 366/273, 272; 261/64, 93
See application file for complete search history.

(56) References Cited

U.S. PATENT DOCUMENTS

| | | | |
|---|---|---|---|
| 9,751,054 | B2 | 9/2017 | Jin et al. |
| 10,143,328 | B2 | 12/2018 | Vestreli et al. |
| 2002/0044496 | A1 | 4/2002 | Lawson |
| 2003/0197080 | A1 | 10/2003 | Karkos, Jr. et al. |
| 2003/0213718 | A1 | 11/2003 | Ducharme et al. |
| 2007/0041268 | A1 | 2/2007 | Beesley et al. |
| 2007/0221068 | A1 | 9/2007 | Boussemart et al. |
| 2008/0173189 | A1 | 7/2008 | Gonneaud et al. |
| 2012/0291637 | A1* | 11/2012 | Yu ........................ A47J 43/0465 99/453 |
| 2015/0265093 | A1* | 9/2015 | Guo ....................... A47J 43/044 261/93 |

FOREIGN PATENT DOCUMENTS

| | | | | |
|---|---|---|---|---|
| CN | 103705072 | A | 4/2014 | |
| CN | 203597808 | U * | 5/2014 | .......... A47J 43/0465 |
| CN | 203619395 | U * | 6/2014 | |
| CN | 204168105 | U | 2/2015 | |
| CN | 106955627 | A * | 7/2017 | |
| JP | S44006395 | U | 3/1969 | |
| JP | 3034787 | U | 3/1997 | |
| JP | H1095569 | A | 4/1998 | |
| JP | 2003102628 | A | 4/2003 | |
| JP | 2014014433 | A | 1/2014 | |
| KR | 20110133940 | A | 12/2011 | |

* cited by examiner

ERGONOMIC WHISK FOR FOOD PROCESSING

CROSS REFERENCE TO RELATED APPLICATIONS

The present application is a National Stage of International Application No. PCT/EP2017/082208, filed on Dec. 11, 2017, which claims priority to European Patent Application No. 16203727.9, filed on Dec. 13, 2016, the entire contents of which are being incorporated herein by reference.

FIELD OF THE INVENTION

The field of the invention pertains to machines for processing a liquid food substance, such as milk or a milk-containing substance. The machine is provided with an ergonomic impeller in a cavity for processing the liquid food substance.

BACKGROUND ART

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

There also exists mechanical stirring appliances which are usually intended for domestic use for beating froth from more or less viscous food products such as eggs, ice, juices or the like. These appliances are usually ill-suited to froth the microbiologically sensitive liquids such as milk. Regular cleaning of the tank of the appliance needs to be envisaged in order to remove any solid food residue. In addition, heating the milk has a tendency to increase the extent to which cooked or burnt proteins are deposited on and adhere to the surfaces. The existing appliances are not, for the most part, well suited to reducing the encrustation of this solid residue, making cleaning troublesome. These appliances also have a stirring and drive mechanism which is fixed and intrudes into the tank, and this presents several disadvantages: the removal/refitting time is not insignificant, they have a tendency to become soiled more quickly, they entail additional cost as a result of the multiplicity of components, and the stirring means are difficult to clean.

U.S. Pat. No. 6,318,247 relates to an appliance for preparing hot beverages or food with stirring such as hot chocolate, for example. Other devices for stirring food products are described in patent documents WO 2004/043213 or DE 196 24 648. Stirring systems with a magnetic engagement type are described in documents U.S. Pat. No. 2,932,493, DE 1 131 372, U.S. Pat. Nos. 4,537,332 and 6,712,497. DE 89 15 094 relates to a refrigerated pot for dispensing a milk-based beverage. U.S. Pat. No. 3,356,349 discloses a stirring device that has a heated tank, magnetic drive means positioned under the tank for driving a hub located in the middle of the tank.

An improved appliance for preparing froth from a milk-based liquid or milk has been proposed in WO 2006/050900, WO 2008/142154, WO 2011/039222 and WO 2011/039224. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing. In WO 2010/023313 a steam source is associated with the stirring effect.

More recently, it has been proposed, as described in WO 2009/074555 and WO 2011/144647, to provide a coffee machine with this type of milk conditioning tank.

Further configurations for processing a milk-based liquid or milk have been proposed in PCT/EP16/063667, PCT/EP16/063664, PCT/EP16/063665 and PCT/EP16/063666.

SUMMARY OF THE INVENTION

It is a preferred object of the present invention to provide a machine for processing a liquid food substance which provides a more ergonomic stirring configuration.

Another preferred object of the present invention is to provide a hygienic machine for heating or cooling a liquid food substance.

A further preferred object of the present invention is to provide a machine for processing a liquid food substance with improved mechanical food conditioning of the liquid food substance.

Hence, the invention relates to a machine for stirring a liquid food substance, such as milk or a milk-based substance, as a standalone machine or as a machine incorporated in a food processor such as a beverage maker e.g. a coffee maker.

The machine may be a standalone machine, e.g. directly pluggable to the mains via an electric cord, or may be integrated in a food processor arranged to process other food items or to carry out different food conditioning processes, the food processor itself being generally pluggable to the mains via an electric cord whereas the machine is a sub-part of the food processor. Such a food processor may be a beverage maker, such as a coffee or chocolate maker, e.g. a beverage maker configured to prepare a beverage (such as coffee or chocolate) from an ingredient capsule.

Standalone and integrated associations of milk frothing machines and coffee makers are for example disclosed in WO 2006/050900, WO 2008/142154, WO 2009/074555, WO 2010/023312 and WO 2010/023313.

Hence, the machine can be suitable for frothing milk by incorporating finely divided gas bubbles, e.g. air bubbles, into milk. When the machine is configured for incorporating gas bubbles into the milk, it may include a further operating mode without incorporation of gas bubbles (e.g. a heating or cooling mode).

The machine has a container delimiting a cavity with a bottom and a peripheral wall for containing the liquid food substance to be stirred. The cavity extends generally along a generally upright central container axis and has a mouth for removing from the container the liquid food substance upon stirring.

The mouth may be covered with a lid for confining the liquid food substance within the cavity.

The container can be generally cup-shaped or bowl-shaped or cylinder-shaped, the peripheral wall being generally upright and the bottom being generally flat or curved.

The container can be provided with a thermally insulating outside material and/or with a handle, for seizure and optional displacement of the container by a human hand. Such a configuration is particularly advantageous when the food is processed at a higher temperature exceeding e.g. 50° C. or below 10° C.

The machine incorporates an impeller comprising an impelling member, e.g. a whisk or wipe or emulsify plate. Such member is configured to be rotated in the cavity against said liquid food substance about an impeller axis that is generally identical or generally parallel to the container axis.

The impelling member may extend over a predominant part of the bottom of the cavity. In this case, the impelling member can generally have or comprise a plate shape, e.g. disk shape.

The impelling member can extend across a substantial part of the bottom of the cavity along a diameter thereof. In this case, the impelling member can be an elongated generally rod-shaped or bar-shaped member (e.g. extending along the bottom wall's diameter) or be formed of a plurality of such elongated members (e.g. up to 6 or 10) in a star arrangement.

The impelling member may extend: over a predominant part of the bottom of the cavity, the impelling member extending typically over at least 75 or 85% of a surface area of the bottom; across a substantial part of the bottom along a diameter thereof, the impelling member extending typically over at least 75 or 85% of a diameter of the bottom.

Suitable examples of shapes of impelling members are disclosed in WO 2006/050900, WO 2008/142154 and PCT/EP16/063667.

Optionally, the machine includes a thermal conditioner for thermally conditioning the liquid food substance in the cavity. The conditioner can be a heater and/or a cooler.

Typically, such thermal conditioner can be configured to heat the cavity's peripheral wall and/or bottom from outside the cavity to thermally condition the liquid food substance contained in the cavity.

For instance, the conditioner is a resistive, inductive or radiating thermal conditioner. The machine may incorporate a control system of the thermal conditioner (heating and/or cooling) for:
- carrying out different thermal conditioning profiles over time and/or for carrying out one or more thermal conditioning profiles of constant or variable value; and/or
- disabling the thermal conditioning.

Examples of suitable thermal conditioners are disclosed in WO 2006/050900, WO 2008/142154 and PCT/EP16/063668.

The impelling member is configured to be spaced above the cavity's bottom by: a maximum stirring distance when the impelling member is rotated at a maximum stirring level at a maximum stirring speed about the impeller axis; and a resting distance when the impelling member stands still at a resting level. The maximum stirring distance is greater than the resting distance.

The maximum stirring speed may be sufficiently high for frothing the liquid food substance when such food substance can be frothed, e.g. milk or a milk-based substance.

The maximum stirring speed of the impelling member may be a rotational speed in the range of 300 to 10000 RPM, for instance 500 to 7500 RPM, such as 800 to 5000 RPM, e.g. 1000 to 3000 RPM.

For instance, the maximum stirring distance may exceed the resting distance by a distance difference in the range of 0.5 to 6 cm, such as 1 to 4 cm, e.g. 1.5 to 3 cm.

In other words, when the impeller is rotated to impart a mechanical effect onto the liquid food substance by contacting it during its rotation, the impeller is located well in the body formed by the liquid food substance so that the liquid food substance is well exposed to the rotating impeller. Conversely, when the impeller is standing still, the impeller member is at a retracted position (at or closer to the container's bottom) to reduce or prevent any interference between the impeller and the removal of the processed liquid food substance, e.g. by dipping a spoon into the body of processed liquid food substance or by pouring it via the container's mouth.

The impelling member can be configured to be spaced above the cavity's bottom by a distance smaller than the maximum stirring distance, e.g. by the resting distance, when it is rotated at a lower stirring level at a slower stirring speed about the impeller axis, the slower stirring speed being slower than the maximum stirring speed. For example, such slower stirring speed is below 25% of the maximum stirring speed, e.g. below 10%. Such slower stirring speed can be below 3% of the maximum stirring speed, such as below 1%, e.g. below 0.25% of the maximum stirring speed.

The level of the impelling member above the cavity's bottom may depend of the speed of the impelling member at which it is rotated about the impeller axis.

The level of the impelling member above the cavity's bottom may depend of the viscosity of the liquid food substance that this stirred and that may even change during the stirring, for instance when the liquid food substance is being frothed e.g. milk that is being frothed.

The machine may include one or more travel stops for preventing the impelling member from moving above a maximum height when rotated, such as a stop projecting from the peripheral wall towards the container axis and/or a stop formed on a guide of the impeller and interfering with an upward movement of the impeller member above the maximum height.

The machine may include one or more travel stops for preventing the impelling member from moving below a minimum height when standing still, such as a stop projecting from the peripheral wall towards the container axis or formed by the bottom and/or a stop formed by a foot of the impeller and interfering with a downward movement of the impeller member below the minimum height.

By using an appropriate stop (e.g. a geometrical stop), the impelling member may be maintained in the container's cavity when the container is tilted (e.g. for dispensing its content) under the action of the stop. In such a case, for removing the impelling member from the cavity, the stop and/or the impelling member can be made deformable, e.g. resiliently deformable, so that it is removable by applying sufficient pressure and/or force.

The machine may incorporate a guide for guiding the impelling member between the maximum stirring level and the resting level. Such guide may be formed by:
- the container's peripheral wall;
- a central axle of the container or of the impeller; and
- a peripheral upright guide surface of the impeller.

Such guide, e.g. such central axle, may bear a marking: at or up to a maximum level of filling the cavity with the liquid food substance before stirring thereof, the guide being free of any marking indicating a level of filling above the maximum level of filling, the maximum level of filling being located above the cavity's bottom at an average vertical distance from the bottom that is smaller than $2/3$ of an average vertical distance spacing the cavity's bottom from the cavity's mouth, such as smaller than ½, for example smaller than ⅓ e.g. ¼, of the average vertical distance spacing the cavity's bottom from the cavity's mouth; and/or at or down to a minimum level of filling the cavity with said liquid food substance before stirring thereof, the guide being free of any marking indicating a level of filling below the minimum level of filling, the minimum level of filling being located above the resting level of the impelling member, e.g. above the maximum stirring level of the impelling member or above ¼ of the vertical way separating the resting level from the maximum stirring level.

Such marking can thus be used as a readily visible indicator or warning for the user to fill the cavity with the liquid food substance (prior to stirring) within a workable range. By omitting a marking at levels at which the filling of the liquid food substance should not be provided, the user is discouraged from filling the container's cavity at such undesirable levels.

By providing, in an exemplary mode, the marking on a central axle of the container's cavity or of the impeller, continuously or intermittently around the entire perimeter of the axle, the marking can be made visible from any (horizontal) angle around the cavity's mouth so that the user does not have to turn the container or turn around the container's mouth to find the marking for selecting the proper level of fill. Even though slightly less convenient, the marking may be provided continuously or intermittently around the entire perimeter of the cavity, e.g. of its peripheral wall.

The impelling member can be arranged to be driven automatically towards the cavity's bottom when the speed of rotation of the impelling member is lowered from the maximum stirring speed towards stand still, for instance under the effect of gravity and/or magnetic effect.

The impelling member may be provided with one or more magnetic elements which cooperate(s) with one or more magnetic elements that is/are located above the impelling member's magnetic element(s) in a repulsion arrangement and/or located below the impelling member's magnetic element(s) in an attraction arrangement, such as a repulsion arrangement formed by two magnetic field-generating elements generally oriented in mutual repulsion and/or attraction arrangement formed by:

two magnetic field-generating elements generally oriented in mutual attraction; and/or a magnetic field-generating element and a ferromagnetic element generally oriented in mutual attraction.

By using a magnetic arrangement to maintain the impelling member at or towards the bottom of the container's cavity, the container can be tilted (e.g. for dispensing its content) while the impelling member is prevented or at least inhibited from dropping out of the cavity.

Typically, the impelling member is driven by a motor. For instance, the motor is located in a motor chamber separate from the container cavity, such as a motor chamber that is located in a docking station for removably receiving the container.

The container may be mechanically passive. Hence, beyond the inherent mechanical properties of the materials making its structure for containing the food substance and for being integrated or assembled in the machine, the container may be free of any mechanically active part such as a motor or movement transformation system which may require special care for hygiene or cleaning purposes.

The container may be electrically passive. Hence, beyond the inherent electric properties of the materials making its structure for containing the food substance and for being integrated or assembled in the machine, the container may be free of any electric active parts such as an electric circuit of discrete or integrated components (e.g. resistors, inductances, transistors, . . . ) that require special care for hygiene or cleaning purposes.

By providing a container which is mechanically and/or electrically passive (optionally with a lid that is equally passive), it can easily be cleaned, e.g. in a dishwater, without any risk of damaging electric and/or mechanic components.

The container can be mounted, such as removably mounted, on or in the docking station. The container may be assembled to or on the docking station or simply placed on or in the docking station. For instance, the container is removable from the docking station for normal operation, e.g. to dispense the food substance, e.g. milk, from the container. The container can be removable from the docking station for servicing or maintenances purposes only.

The motor chamber may include one or more electric components, such as a component in the form of a generator of an oscillating electromagnetic field directed to the container for heating the liquid food substance in the container.

One or more of the electric components can include at least one of a control unit and a power management unit.

The motor chamber may be associated with means for evacuating undesired heat, e.g. as disclosed in PCT/EP16/063668.

The motor can have an output shaft that is magnetically coupled to the impelling member via the container bottom and/or peripheral wall for driving the impelling member.

The output shaft may drive an arrangement of driving magnetic elements, such as magnetic elements in a ring-like arrangement and/or located in or on a driving disc.

The arrangement of driving magnetic elements can be located adjacent a peripheral part of the cavity's bottom or around the cavity's peripheral wall.

The impeller can have an arrangement of driven magnetic elements that cooperate magnetically with the driving magnetic elements so as to drive the impeller in rotation.

The driven magnetic elements may be in a configuration that has one or more of the following features:

in a generally parallel e.g. generally collinear orientation with at least some of the driving magnetic elements;

located in or on a support rotating the impelling member, e.g. in or on a driven disc and/or in or on cavities or openings of such support; and in a ring-like arrangement, e.g. a ring-like arrangement in a ring corresponding to and facing a ring containing a ring-like arrangement of the driving magnetic elements.

At least one driven magnetic elements may be a permanent magnet that is positioned to:

generally face a first driving magnetic element in a generally attraction orientation relative to this at least one driven magnetic element for driving thereof in rotation, such as an attracting electromagnet or permanent magnet; and be off-set relative to a second driving magnetic element in a generally repulsion orientation relative to the at least one driven magnetic element for driving thereof in rotation, such as a repulsive electromagnet or permanent magnet, such as a second driving magnetic element in repulsion orientation adjacent the driving magnetic element in attraction orientation.

In one embodiment, each driven magnetic element is positioned to generally face a respective first driving magnetic element in a generally attraction orientation and to be off-set relative to a respective second driving magnetic element in a generally repulsion orientation.

The or each driven magnetic element may generate with:
its corresponding first driving magnetic element that is in a generally attraction orientation a cumulated attractive magnetic field; and
its corresponding second driving magnetic element that is in a generally repulsion orientation a cumulated repulsive magnetic field,
such that the cumulated repulsive magnetic field is greater than the attractive magnetic field, e.g. the second driving magnetic element in the generally repulsion orientation generating a magnetic field greater than the first magnetic field generated by the driving magnetic element in the generally attraction orientation.

For instance, the cumulated repulsive magnetic field and the cumulated attractive magnetic field may have a ratio of at least 1.02, such as a ratio in the range of 1.03 to 1.25, for instance 1.05 to 1.2, for example 1.08 to 1.15, e.g. in the range of 1.11 to 1.13.

When placed against an iron plate, the total force of all the first driving magnetic elements may be in the range of 25 to 75 N, e.g. about 45 to 60 N.

When placed against an iron plate, the total force of all the second driving magnetic elements may be in the range of 50 to 125 N, e.g. about 75 to 100 N.

To remove the impeller when in place in the cavity in a position for being rotated against the liquid food substance, it may be necessary to exercise a force on the impeller in a direction away from the arrangement of driving magnetic elements. Such exercised removal force may be in the range of 1 to 50 N, such as 3 to 30 N, for instance 4 to 15 N, e.g. 5 to 10 N.

When in place in the cavity in a position for being rotated against the liquid food substance the arrangement of driving magnetic elements may be spaced from the driving magnetic elements by a distance in the range of 2 to 15 mm, such as 3 to 10 mm, e.g. 4 to 7 mm.

In such a configuration all magnetic elements are used for driving (magnetically pushing or pulling) the impeller. By providing a configuration where some magnets operate in attraction and some in repulsion, the overall attraction force between the impeller and the output shaft can be reduced while increasing the maximum torque that can be transmitted from the output shaft to the impeller. Hence, impellers with high inertia and/or for operating in (relatively) high viscosity liquid food substances can be used and also be removed from the cavity without requiring the user to exercise a relatively high force for such removal.

Moreover, by providing one driven magnetic element at the side of the impeller for two driving magnetic elements (in attraction and in repulsion) at the side of the output shaft, the inertia (caused by the weight) at the impeller's side can be reduced while maintaining a good magnetic transmission of the torque.

In an embodiment, the impeller is provided with a total number of driven magnetic elements in the range of 2 to 10, e.g. in the range of 4 to 8, the total number of driving magnetic elements at the level of the drive shaft being double the number of driven magnetic elements.

The impeller can have a support that is movable relatively to the impelling member and that is rotated to rotate the impelling member, the support having a drive surface, such as a drive surface that is formed by a central axle and/or peripheral upright guide surface that is rotated to rotate the impelling member. For instance, the drive surface has a cam that engages with a cam-follower of the impelling member, such as a helicoidal cam, for moving the impelling member to the maximum stirring level when the impelling member is rotationally accelerated towards the maximum stirring speed and for moving the impelling member towards the rest level when the impelling member is rotationally decelerated towards stand still. The drive surface and the impelling member may of course have an inverted cam and cam-follower arrangement, i.e. the cam being on the impelling member and the cam-follower being on the drive surface.

The helicoidal cam (when present) can have a constant or a variable pitch. A variable pitch can be provided to adjust the height of the impelling member according to its rotational speed.

The support may be configured for spacing the impelling member above the cavity's bottom, such as a foot spaced under the impelling member by a distance in the range of 0.5 to 5 cm e.g. 1 to 3.5 cm.

The support can have a downwardly-oriented convex curved contact surface, e.g. a downwardly projecting pin, such that the impeller rests on the bottom wall entirely via this convex curved contact surface. The convex curved contact can be in contact with the bottom wall over a total surface area of typically less than 5 mm$^2$, such as less than 4 e.g. less than 3 for instance less than 2 for example less than 0.3 mm$^2$.

The contact surface can be made of hard polymeric material, such as hard plastic, or of food-safe stainless steel and be supported by a surface of the bottom wall made of ceramic material, such as PTFE, or of food-safe stainless steel e.g. AiSi 304 steel.

The impelling member may have a lifting surface, e.g. a hydrofoil or wing-like shape, to lift the impelling member when located in the liquid food substance and rotationally accelerated towards the maximum stirring speed.

The impelling member can have a processing surface for imparting a mechanical effect to the liquid food substance, such as for mixing the liquid food substance with another fluid, e.g. air.

The machine may have a holder, e.g. a removable holder, for holding one or more ingredients and/or one or more thermal-transfer elements. The holder may be connected to the impelling member for being driven with the impelling member in the liquid food substance.

Such thermal-transfer element(s) may have at least one element selected from an ice cube, e.g. a water ice cube or milk ice cube, a heated or cooled insert, such as an inert insert, typically a food-grade insert.

Such ingredient(s) may include:
at least one ingredient selected from coffee e.g. instant coffee, cacao, chocolate, sugar, honey, milk and cream; and/or
at least one ingredient supplied in or as a solid ingredient bulk, e.g. generally shaped as a parallelepiped, a prism, a pyramid e.g. a truncated pyramid, a polyhedron e.g. a octahedron or an icosidodecahedron or a rhombicuboctahedron, a cylinder, a cone e.g. a truncated cone, a sphere e.g. a truncated sphere, an ellipsoid e.g. a truncated ellipsoid, or an ovoid e.g. a truncated ovoid.

The holder may form a basket for containing such one or more ingredients and/or one or more thermal-transfer elements, the basket having one or more side openings for an ingredient and/or thermal side transfer from inside to outside the holder, the basket being formed as a generally continuous single seat or as a plurality of seats for the ingredient(s) and/or thermal-transfer element(s), such as a plurality of seats separated by partitions, e.g. partitions in the form of generally radially projecting ribs or wings or edges.

Examples of suitable holders are disclosed in WO 2011/039222 and in WO 2011/039224.

Magnetic field-generating element(s) may include, as appropriate, an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

Ferromagnetic element(s) can be made of at least one of Co, Fe, $Fe_2O_3$, $FeOFe_2O_3$, $NiOFe_2$, $CUOFe_2O_3$, $MgO$ $Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2CO_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

BRIEF DESCRIPTION OF THE DRAWINGS

The invention will now be described with reference to the schematic drawings, wherein.

DETAILED DESCRIPTION

Figure 1:
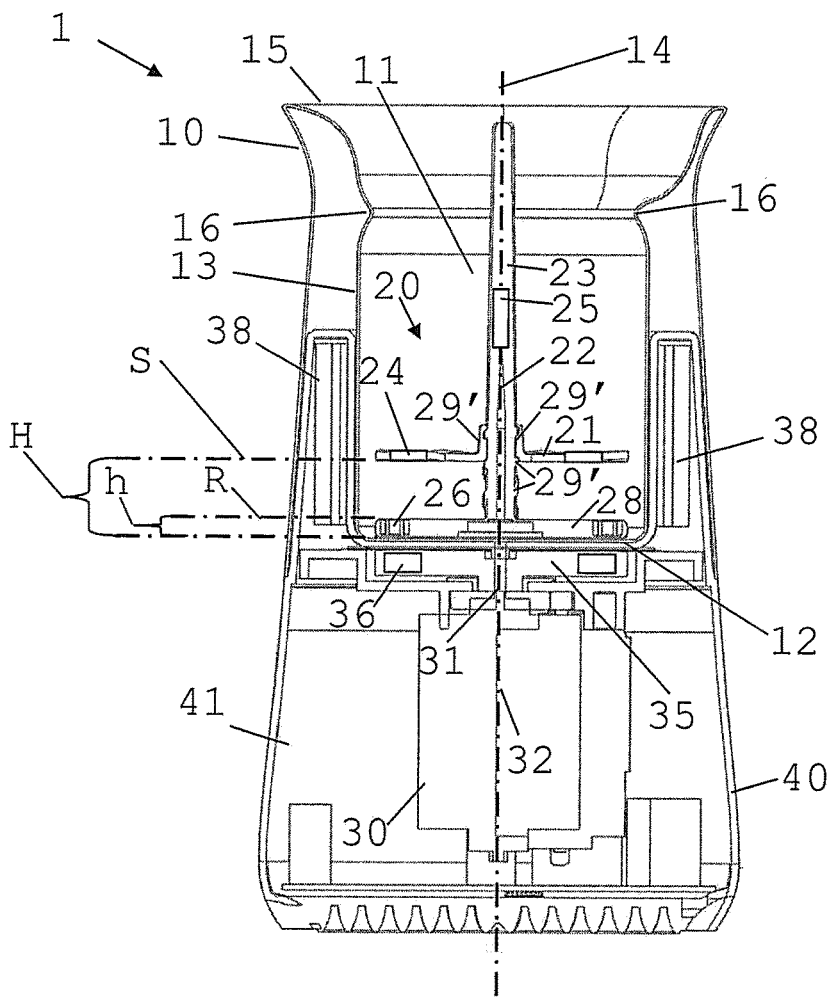
FIG. 1 is a cross-sectional view of a machine according to the invention having an impeller.
Figures 2, 3:
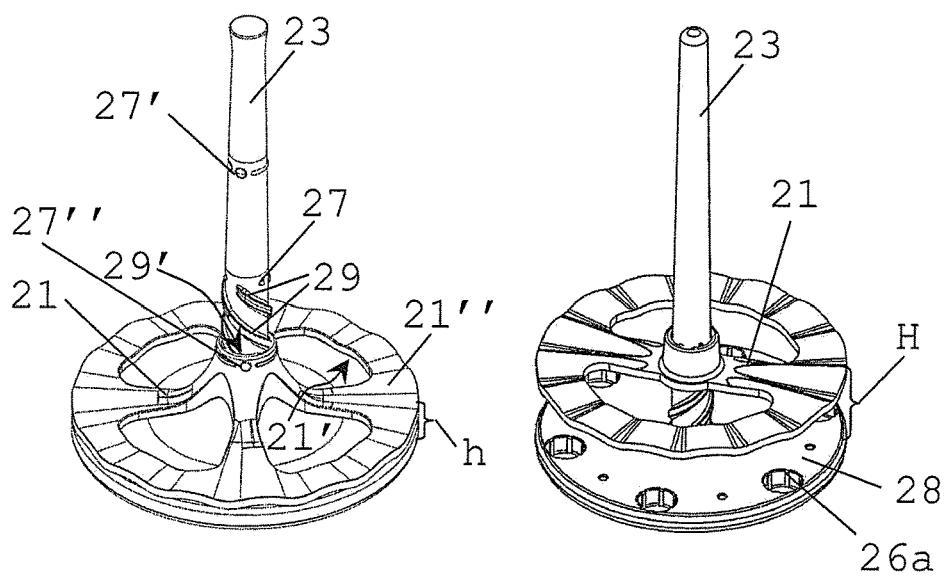
FIG. 2 is a perspective view of an impeller with an impelling member at a resting level that can be fitted in the machine of FIG. 1.
FIG. 3 shows another impeller (having a slightly different design) with an impelling member at a maximum stirring level that can be fitted in the machine of FIG. 1.
Figure 4:
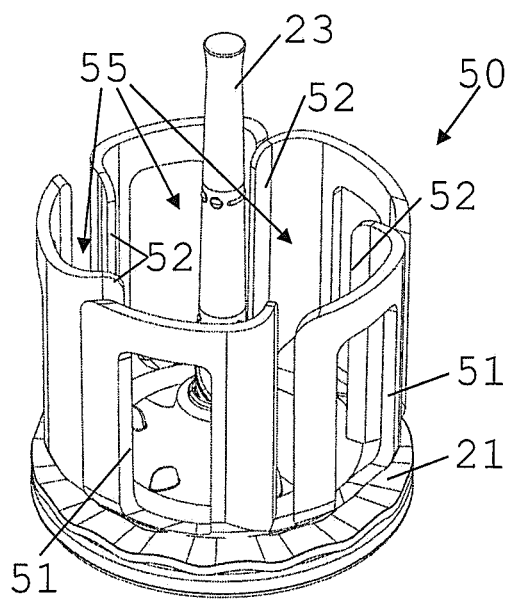
FIG. 4 is a perspective view of a holder for holding one or more ingredients and/or one or more thermal-transfer elements that can be fitted onto the impeller of FIG. 2 or 3.
Figure 5:
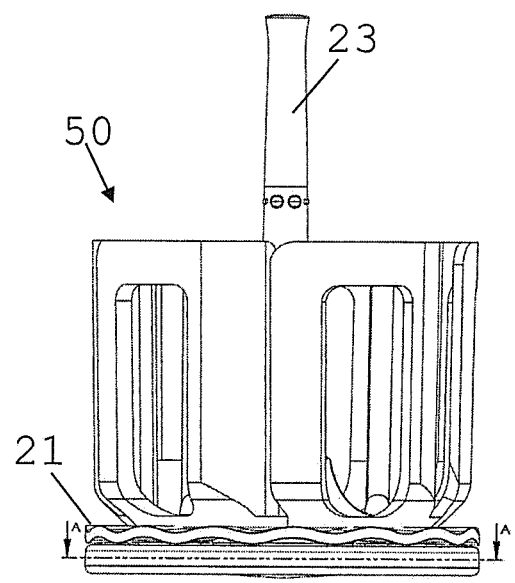
FIG. 5 is a side view of the holder of FIG. 4.
Figure 6:
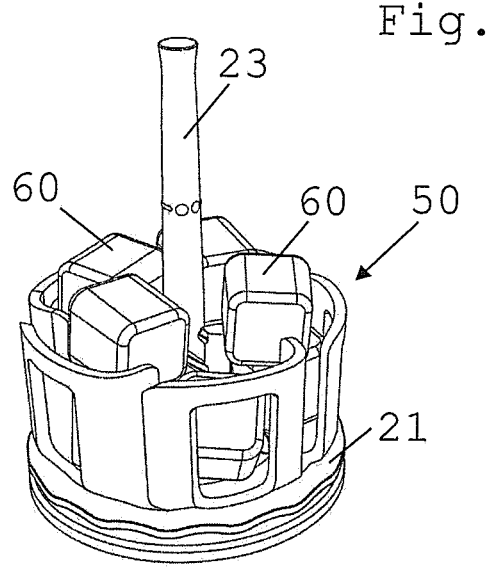
FIG. 6 illustrates the holder of FIGS. 4 and 5 with one or more thermal-transfer elements.
Figure 7:
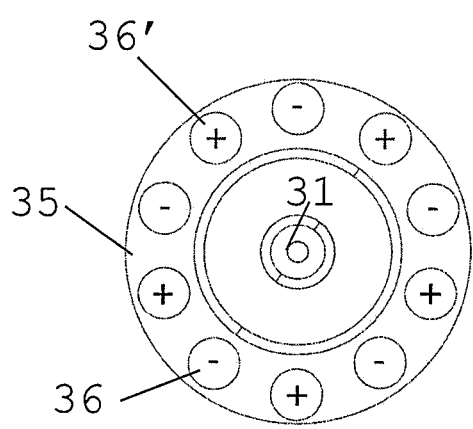
FIG. 7 illustrates an arrangement of driving magnetic elements that can be fitted in the machine of FIG. 1 and connected to a motor for driving the impeller.
Figure 8:
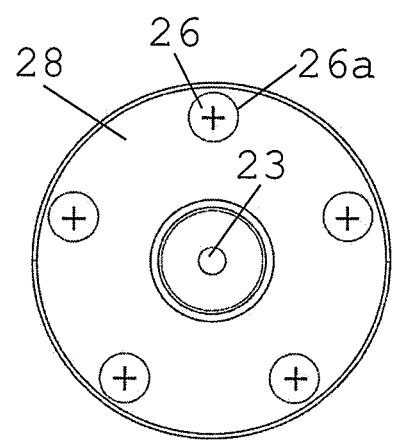
FIG. 8 illustrates an arrangement of driven magnetic elements that can be mounted to the impeller of FIG. 1 so that the impeller can be driven by the arrangement of driving magnetic elements of FIG. 7.

FIGS. 1 to 8, in which the same references generally designate the same elements, illustrate an exemplary embodiment of a machine 1 for stirring a liquid food substance, such as milk or a milk-based substance.

Machine 1 can be a standalone machine or a machine incorporated in a food processor such as a beverage maker e.g. a coffee maker.

Machine 1 includes a container 10 delimiting a cavity 11 with a bottom 12 and a peripheral wall 13 for containing such liquid food substance to be stirred. Cavity 11 extends generally along a generally upright central container axis 14 and has a mouth 15 for removing from container 10 such liquid food substance upon stirring.

Machine 1 incorporates an impeller 20 having an impelling member 21, e.g. a whisk or wipe or emulsify plate, which is configured to be rotated in cavity 11 against such liquid food substance about an impeller axis 22 that is generally identical or generally parallel to container axis 14.

Optionally, machine 1 can have a thermal conditioner 38 for thermally conditioning such liquid food substance in cavity 11, such as a heater and/or a cooler, e.g. a resistive, inductive or radiating thermal conditioner.

Thermal conditioner 38 may be configured to heat the cavity's peripheral wall 13 and/or bottom 12 from outside cavity 11 to thermally condition such liquid food substance contained in the cavity 11.

Impelling member 21 is configured to be spaced above cavity's bottom 12 by: a maximum stirring distance H when impelling member 21 is rotated at a maximum stirring level S at a maximum stirring speed about impeller axis 22; and a resting distance h when impelling member 21 stands still at a resting level R. The maximum stirring distance H is greater than resting distance h.

For instance, maximum stirring distance H may exceed resting distance h by a distance difference in the range of 0.5 to 6 cm, such as 1 to 4 cm, e.g. 1.5 to 3 cm.

Impelling member 21 may be configured to be spaced above the cavity's bottom 12 by a distance smaller than maximum stirring distance H, e.g. by the resting distance h, when it is rotated at a lower stirring level at a slower stirring speed about impeller axis 22, the slower stirring speed being slower than the maximum stirring speed. Such slower stirring speed may be below 25% of the maximum stirring speed, for instance below 10%, such as below 3%, for example below 1%, e.g. below 0.25% of the maximum stirring speed.

The level of impelling member 21 above cavity's bottom 12 may depend of the speed of impelling member 21 at which it is rotated about impeller axis 22.

The level of impelling member 21 above cavity's bottom 12 may depend of the viscosity of the liquid food substance that this stirred and that may even change during the stirring, e.g. if for instance the liquid food substance is being frothed such as milk that is being frothed.

Machine 1 may include one or more travel stops 16,27; 12,28 for preventing impelling member 21 from moving:

above a maximum height when rotated, such as a stop 16 projecting from peripheral wall 13 towards container axis 14 and/or a stop 27 formed on a guide 23 of impeller 20 and interfering with an upward movement of impeller member 21 above the maximum height; and/or below a minimum height when standing still, such as a stop 12 projecting from peripheral wall 13 towards container axis 14 or formed by bottom 12 and/or a stop 28 formed by a foot 28 of impeller 20 and interfering with a downward movement of impeller member 21 below the minimum height.

Machine 1 may include a guide 13,23 for guiding impelling member 21 between maximum stirring level S and the resting level R, such as at least one guide formed by:

the container's peripheral wall 13;

a central axle 23 of the container or of impeller 20; and a peripheral upright guide surface of the impeller.

In an example, such guide, e.g. central axle 23, may bear a marking 27,27',27" at or up to a maximum level of filling cavity 11 with said liquid food substance before stirring thereof. The guide can be free of any marking indicating a level of filling above the maximum level of filling 27,27'. The maximum level of filling may be located above the cavity's bottom 12 at an average vertical distance from bottom 12 that is smaller than ⅔ of an average vertical distance spacing the cavity's bottom 12 from the cavity's mouth 15, such as smaller than ½, for example smaller than ⅓ e.g. ¼, of the average vertical distance spacing cavity's bottom 12 from cavity's mouth 15.

In an example, such guide, e.g. central axle 23, may bear a marking 27,27',27" at or down to a minimum level 27,27" of filling cavity 11 with the liquid food substance before stirring thereof. The guide can be free of any marking indicating a level of filling below the minimum level of filling 27,27", the minimum level of filling being located above resting level R of impelling member 21, e.g. above maximum stirring level S of the impelling member 21 or above ¼ of the vertical way separating the resting level R from the maximum stirring level S.

Impelling member 21 can be arranged to be driven automatically towards the cavity's bottom 12 when the speed of rotation of impelling member 21 is lowered from the maximum stirring speed towards stand still, for instance under the effect of gravity and/or magnetic effect.

Impelling member 21 may be provided with one or more magnetic elements 24 which cooperate(s) with one or more magnetic elements 25,26,36 that is/are located above impelling member's magnetic element(s) 24 in a repulsion arrangement and/or located below the impelling member's magnetic element(s) 24 in an attraction arrangement.

Repulsion arrangement 24,25 may be formed by two magnetic field-generating elements generally oriented in mutual repulsion.

Attraction arrangement 24,26;24,36 can be formed by: two magnetic field-generating elements generally oriented in mutual attraction; and/or a magnetic field-generating element and a ferromagnetic element generally oriented in mutual attraction.

Impelling member 21 may be driven by a motor 30. For instance, motor 30 is located in a motor chamber 41 separate from container cavity 11. Motor chamber 41 can be located in a docking station 40 for removably receiving container 10.

Motor 30 may have an output shaft 31 that is magnetically coupled to impelling member 21 via container bottom 12 and/or peripheral wall 13 for driving impelling member 21.

Output shaft 31 may drive an arrangement of driving magnetic elements 36,36', such as magnetic elements 36,36' in a ring-like arrangement and/or located in or on a driving disc 35. Impeller 20 may have an arrangement of driven magnetic elements 26 that cooperate magnetically with driving magnetic elements 36,36' so as to drive impeller 20 in rotation.

For instance, such driven magnetic elements 26 can be in a configuration that has one or more of the following features:
- in a generally parallel e.g. generally collinear orientation with at least some of the driving magnetic elements 36,36';
- located in or on a support 23,28 rotating impelling member 21, e.g. in or on a driven disc 28 and/or in or on cavities or openings 26a of such support; and
- in a ring-like arrangement, e.g. a ring-like arrangement in a ring corresponding to and facing a ring containing a ring-like arrangement of driving magnetic elements 36,36'.

At least one driven magnetic elements 26 can be a permanent magnet that is positioned to:
- generally face a first driving magnetic element 36 in a generally attraction orientation relative to at least one driven magnetic element 26 for driving thereof in rotation, such as an attracting electromagnet or permanent magnet 36; and
- be off-set relative to a second driving magnetic element 36' in a generally repulsion orientation relative to at least one driven magnetic element 26 for driving thereof in rotation, such as a second repulsive electromagnet or permanent magnet 36', such as a further driving magnetic element 36' in repulsion orientation adjacent driving magnetic element 36 in attraction orientation.

For instance, each driven magnetic element 26 is positioned to generally face a respective first driving magnetic element 36 in a generally attraction orientation and to be off-set relative to a respective second driving magnetic element 36' in a generally repulsion orientation.

The or each driven magnetic element 26 may generate with:
- its corresponding first driving magnetic element 36 that is in a generally attraction orientation a cumulated attractive magnetic field; and
- its corresponding second driving magnetic element 36' that is in a generally repulsion orientation a cumulated repulsive magnetic field, such that the cumulated repulsive magnetic field is greater than the attractive magnetic field, e.g. second driving magnetic element 36' in the generally repulsion orientation generating a magnetic field greater than the magnetic field generated by first driving magnetic element 36 in the generally attraction orientation.

For instance cumulated repulsive magnetic field and the cumulated attractive magnetic field can have a ratio of at least 1.02, such as a ratio in the range of 1.03 to 1.25, for instance 1.05 to 1.2, for example 1.08 to 1.15, e.g. in the range of 1.11 to 1.13.

When placed against an iron plate, the total force of all first driving magnetic elements 36 may be in the range of 25 to 75 N, e.g. about 45 to 60 N.

When placed against an iron plate, the total force of all second driving magnetic elements 36' may be in the range of 50 to 125 N, e.g. about 75 to 100 N.

When placed against an iron plate, the total force of all driven magnetic elements 26 may be in the range of 25 to 75 N, e.g. about 45 to 60 N.

To remove impeller 20 when in place in cavity 11 in a position for being rotated against the liquid food substance, it may be necessary to exercise a force on impeller 20 in a direction away from the arrangement of driving magnetic elements 36,36'. Such exercised removal force may be in the range of 1 to 50 N, such as 3 to 30 N, for instance 4 to 15 N, e.g. 5 to 10 N.

When in place in cavity 11 in a position for being rotated against the liquid food substance the arrangement of driving magnetic elements 36,36' may be spaced from driving magnetic elements 26 by a distance in the range of 2 to 15 mm, such as 3 to 10 mm, e.g. 4 to 7 mm.

Impeller 20 may have a support 23,28 that is relatively movable to impelling member 21 and that is rotated to rotate impelling member 21, the support 23,28 having a drive surface, such as a drive surface that is formed by a central axle 23 and/or peripheral upright guide surface that is rotated to rotate the impelling member.

The drive surface may have a cam 29 that engages with a cam follower 29' of impelling member 21 such as a helicoidal cam 29 for moving impelling member 21 to maximum stirring level S when impelling member 21 is rotationally accelerated towards the maximum stirring speed and for moving impelling member 21 towards rest level R when impelling member 21 is rotationally decelerated towards stand still. The drive surface and impelling member 21 may have an inverted cam and cam-follower arrangement. The helicoidal cam (when present) can have a constant or a variable pitch. A variable pitch can be provided to adjust the height of impelling member 21 according to its rotational speed.

Impelling member 21 may have a lifting surface 21', e.g. a hydrofoil or wing-like shape, to lift impelling member 21 when in the liquid food substance and when rotationally accelerated towards the maximum stirring speed.

Impelling member 21 can have a processing surface 21" for imparting a mechanical effect to the liquid food substance, such as for mixing the liquid food substance with another fluid, e.g. air.

Machine 1 may include a holder 50, e.g. a removable holder, for holding one or more ingredients and/or one or more thermal-transfer elements 60, holder 50 being connected to impelling member 21 for being driven with impelling member 21 in the liquid food substance.

One or more thermal-transfer elements 60 may include at least one element selected from an ice cube, e.g. a water ice cube or milk ice cube, a heated or cooled insert, such as an inert insert, typically a food-grade insert.

One or more ingredients may include at least one ingredient selected from coffee e.g. instant coffee, cacao, chocolate, sugar, honey, milk and cream.

At least one ingredient can be supplied in or as a solid ingredient bulk 60, e.g. generally shaped as a parallelepiped, a prism, a pyramid e.g. a truncated pyramid, a polyhedron e.g. a octahedron or an icosidodecahedron or a rhombicuboctahedron, a cylinder, a cone e.g. a truncated cone, a sphere e.g. a truncated sphere, an ellipsoid e.g. a truncated ellipsoid, or an ovoid e.g. a truncated ovoid.

Holder 50 may form a basket for containing such one or more ingredients and/or one or more thermal-transfer elements, the basket having one or more side openings 51 for an ingredient and/or thermal side transfer from inside to outside holder 50. The basket can be formed as a generally continuous single seat or as a plurality of seats 55 for the ingredient(s) and/or thermal-transfer element(s), such as a plurality of seats separated by partitions, e.g. partitions in the shape of generally radially projecting ribs or wings or edges 52.

The invention claimed is:

1. A machine for stirring a liquid food substance as a standalone machine or as a machine incorporated in a food processor, the machine comprising:
   a container defining a cavity with a bottom and a peripheral wall for containing the liquid food substance to be stirred, the cavity extending generally along a generally upright central container axis and having a mouth for removing from the container the liquid food substance upon stirring;
   an impeller comprising an impelling member, which is configured to be rotated in the cavity against the liquid food substance about an impeller axis that is generally identical or generally parallel to the container axis; and
   the impelling member is configured to be spaced above the bottom of the cavity by:
      a maximum stirring distance defined between the impelling member and the bottom of the cavity when the impelling member is rotated at a maximum stirring level at a maximum stirring speed about the impeller axis; and
      a resting distance defined between the impelling member and the bottom of the cavity when the impelling member stands still at a resting level,
      the maximum stirring distance being greater than the resting distance,
   wherein the impeller has a support that is relatively movable to the impelling member and that is rotated to rotate the impelling member, the support having at least one surface selected from the group consisting of (i) a drive surface and (ii) a peripheral upright guide surface that is rotated to rotate the impelling member,
   wherein the drive surface comprises a cam that engages with a cam-follower of the impelling member for moving the impelling member to the maximum stirring level when the impelling member is rotationally accelerated towards the maximum stirring speed and for moving the impeller towards the rest level when the impelling member is rotationally decelerated towards stand still.

2. The machine of claim 1, wherein the impelling member is configured to be spaced above the bottom of the cavity by a distance smaller than the maximum stirring distance, when the impelling member is rotated at a lower stirring level at a slower stirring speed about the impeller axis, the slower stirring speed being slower than the maximum stirring speed.

3. The machine of claim 1, wherein the level of the impelling member above the bottom of the cavity depends on at least one parameter selected from the group consisting of (i) a speed of the impelling member at which it is rotated about the impeller axis and (ii) a viscosity of the liquid food substance that is being stirred.

4. The machine of claim 1, comprising one or more travel stops for preventing the impelling member from moving to at least one height selected from the group consisting of (i) above a maximum height when rotated and
   (ii) below a minimum height when standing still.

5. The machine of claim 1, comprising a guide for guiding the impelling member between the maximum stirring level and the resting level.

6. The machine of claim 1, wherein the impelling member is arranged to be driven automatically towards the bottom of the cavity when the speed of rotation of the impelling member is lowered from the maximum stirring speed towards stand still.

7. The machine of claim 1, wherein the impelling member is driven by a motor.

8. The machine of claim 7, wherein the motor has an output shaft for driving the impelling member that is magnetically coupled to the impelling member via at least one part of the container selected from the group consisting of the bottom of the cavity and the peripheral wall of the cavity.

9. The machine of claim 8, wherein the output shaft drives an arrangement of driving magnetic elements, and wherein the impeller has an arrangement of driven magnetic elements that cooperate magnetically with the driving magnetic elements so as to drive the impeller in rotation.

10. The machine of claim 9, wherein at least one of the driven magnetic elements is a permanent magnet that is positioned to generally face a first driving magnetic element in a generally attraction orientation relative to the at least one driven magnetic element for driving thereof in rotation.

11. The machine of claim 10, wherein each driven magnetic element generates magnetic fields with the first driving magnetic element and a second driving magnetic element,
   wherein each driven magnetic element and the first driving magnetic element that is in a generally attraction orientation generate a cumulated attractive magnetic field; and
   wherein each driven magnetic element and the second driving magnetic element that is in a generally repulsion orientation generate a cumulated repulsive magnetic field.

12. The machine of claim 1, wherein the liquid food substance is milk or a milk-based substance.

13. The machine of claim 1, wherein the impelling member comprises a processing surface for imparting a mechanical effect to the liquid food substance.

14. The machine of claim 1, wherein the cam is a helicoidal cam.

15. The machine of claim 14, wherein the helicoidal cam has a variable pitch to adjust a height of the impelling member according to a rotational speed of the impelling member.

16. The machine of claim 1, wherein a rotational speed of the impelling member is variable.

* * * * *